United States Patent [19]
Motoyama

[11] Patent Number: 5,913,202
[45] Date of Patent: Jun. 15, 1999

[54] FINANCIAL INFORMATION INTERMEDIARY SYSTEM

[75] Inventor: Takeshi Motoyama, Tokyo, Japan

[73] Assignee: Fujitsu Limited, Kawasaki, Japan

[21] Appl. No.: 08/874,979

[22] Filed: Jun. 13, 1997

[30] Foreign Application Priority Data

Dec. 3, 1996 [JP] Japan .................................. 8-322438

[51] Int. Cl.⁶ .................................................. G06F 19/00
[52] U.S. Cl. ................................ 705/35; 705/36; 705/37
[58] Field of Search ................................ 705/35, 36, 37, 705/39; 235/379, 380

[56] References Cited

U.S. PATENT DOCUMENTS 5,644,727  7/1997  Atkins ........................................ 705/35

*Primary Examiner*—Allen R. MacDonald
*Assistant Examiner*—Penny Caudle
*Attorney, Agent, or Firm*—Staas & Halsey

[57] ABSTRACT

A financial information intermediary system which extracts the most suitable product information from a wide variety of financial product information supplied by many financial institutions in the market, so that consumers (or clients) can easily reach the desired financial products. To provide information intermediary services, a financial delivery computer is placed between the clients and a plurality of financial institutions. The financial delivery computer comprises a service selection/execution unit, financial institution data files, and client data files. The financial institution data files are used to store information on various financial products collected from the financial institutions. The client data files store each client's preference information. Upon receipt of a product selection request from a client terminal, the service selection/execution unit retrieves the preference information relevant to the requesting client, and then searches the financial institution data files for appropriate product information based on the retrieved preference information. The system thus helps the client to make a right choice by referring to the qualified product information extracted from the industry-wide database.

10 Claims, 13 Drawing Sheets

| ITEM | OPTION |
|---|---|
| RISK-RETURN TRADEOFFS | HIGH-RISK/HIGH-RETURN TYPE<br>LOW-RISK/LOW-RETURN TYPE<br>PORTFOLIO BALANCE TYPE<br>BIDIRECTIONAL ONLINE COMPETITION TYPE |
| CATEGORY OF FINANCIAL INSTITUTIONS | BANKS (WITH RANK CLASSIFICATION)<br>SECURITIES FIRMS<br>(WITH RANK CLASSIFICATION) |
| CATEGORY OF INVESTMENT INSTRUMENTS | DEPOSIT/SAVING/GOVERNMENT BOND-RELATED<br>STOCK/SECURITIES-RELATED |
| PRODUCT PREFERENCE | |
| TERMS OF INVESTMENT | |
| CLIENT'S PRIVATE INFORMATION | FAMILY STRUCTURE<br>ANNUAL INCOME<br>NEEDS FOR FUTURE LIFE PLANS |
| : | |

FIG. 3

```
        ┌─111
┌─────────────────────────────────────┐
│ ☆TRANSACTION (FUND ALLOCATION)      │
│ ─────────────────────────────────── │
│  —  SOURCE:      DEPOSIT ACCOUNT    │
│  —  LOCATION:    BANK-A             │
│  —  AMOUNT:      $100,000           │
│  —  TERM:        3 YEARS            │
│  —  USE YOUR PREFERENCE DATA:  YES  │
└─────────────────────────────────────┘
```

FIG. 5

★RECOMMENDED PRODUCT LIST

| FINANCIAL INSTITUTION | PRODUCT NAME | INTEREST RATE | INTEREST PAYMENT | | FINAL YIELD | REMARKS |
|---|---|---|---|---|---|---|
| i — BANK-A | PRODUCT a | 1.5% | VARIABLE | HALF-YEAR COMPOUND | 2.0% | - - - |
| ii — BANK-B | PRODUCT b | 1.6% | VARIABLE | ONE-YEAR COMPOUND | 1.8% | - - - |
| iii — BANK-C | PRODUCT c | 1.2% | FIXED | ONE-YEAR COMPOUND | 1.5% | FREE MOVIE TICKET OFFERED |
| . . . | | | | | | |

112

YOUR CHOICE: ii (BANK-B SELECTED)    ELECTRONIC SIGNATURE   ABCDEF, KEY1234567)

FIG. 6

☆TRANSACTION COMPLETION REPORT

— TRADE: ·BANK-A TO BANK-B, PRODUCT b
— AMOUNT: ·$100,000
— DATE OF CONTRACT: ·MAY 30, 1997

☆TRANSACTION (ACCOUNT MOVEMENT)

— MOVE: AUTOMATIC BILL PAYMENT ACCOUNT
— FROM: BANK-A
— TO　 : BANK-B
— FOR : ALL PUBLIC UTILITY CHARGES

FIG. 9

```
  ┌ 116
┌─────────────────────────────────────────────────────┐
│ ☆TRANSACTION COMPLETION REPORT                      │
│  ─────────────────────────                          │
│  — TRANSACTION: ACCOUNT MOVEMENT FROM BANK-A TO BANK-B │
│  — MOVED : AUTOMATIC BILL PAYMENT ACCOUNT           │
│  — PAY FOR : GAS AND WATER CHARGES                  │
│  — EFFECTIVE FROM: MAY 30, 1997                     │
└─────────────────────────────────────────────────────┘
```

FIG. 10

```
┌─────────────────────────────────────────┐
│ ☆TRANSACTION (ONLINE COMPETITION)       │
│ ─────────────────────────────────────── │
│   —   SOURCE: DEPOSIT ACCOUNT           │
│   —   LOCATION: BANK-A                  │
│   —   AMOUNT: $100,000                  │
│   —   TERM: 3 YEARS                     │
│   —   USE YOUR PREFERENCE DATA: YES     │
└─────────────────────────────────────────┘
```
⎿ 121

BANK-A  NEGOTIATING
PRODUCT NAME: a
INTEREST RATE:1.5%  YIELD:2.0%
VARIABLE RATE / HALF-YEAR
　　　　　　　　COMPOUND
FEATURE: xxxxxxxccccccc

BANK-B  NEGOTIATING
PRODUCT NAME: b
INTEREST RATE:1.6%  YIELD:1.8%
FIXED RATE / ONE-YEAR
　　　　　　　COMPOUND
FEATURE: xxxxxxxcccccc

BANK-C
PRODUCT NAME: c
INTEREST RATE:1.2%  YIELD:1.5%
FIXED RATE / ONE-YEAR
　　　　　　　COMPOUND
FEATURE:FREE MOVIE TICKET OFFER

BANK-D
PRODUCT NAME: d
INTEREST RATE:1.2%  YIELD:1/5%
VARIABLE RATE / ONE-YEAR
　　　　　　　　COMPOUND
FEATURE: xxxxxxxcccccc

BANK-E  NEGOTIATING
PRODUCT NAME: e
INTEREST RATE:1..2%  YIELD:1.5%
VARIABLE RATE / ONE-YEAR
　　　　　　　　COMPOUND
FEATURE: xxxxxxxcccccc

BANK-F
PRODUCT NAME: f
INTEREST RATE:1.2%  YIELD:1.5%
VARIABLE RATE / ONE-YEAR
　　　　　　　　COMPOUND
FEATURE: xxxxxxxcccccc COUNTERPART OF NEGOTIATION (AT PRESENT)    WHICH DO YOU SELECT?
NEGOTIATE INDIVIDUALLY?
OR CHANGE REQUIREMENTS?

FINANCIAL INFORMATION INTERMEDIARY SYSTEM

BACKGROUND OF THE INVENTION

1. Field of the Invention

The present invention relates to a financial information intermediary system, and more particularly, to a financial information intermediary system that supplies clients with a collection of on-line information on financial products that suit their needs and preferences, by selecting out of a variety of products available from a plurality of financial institutions.

2. Description of the Related Art

The popularization of commercial online services and the exploding use of the Internet in recent years have caused a significant change in the existing online commerce systems in terms of their structures and functions. There are a numerous pieces of product information available online for browsing purposes, and consumers can select the desired products that suit their taste and make online purchases. Today, many financial products supplied by banks and other financial institutions are also accessible to the clients in the same way, which services are called online banking services. In general, financial products include a wide variety of derivatives that may look similar but different in reality. Furthermore, a number of new products have been introduced to the market from many companies including foreign firms, since overall government controls are loosened by deregulation of financial systems. Consumers search the online information by themselves to make the best choice.

Home banking systems are known as typical online commerce systems, which will allow the clients to electronically access to their individual bank accounts by connecting their home terminals to a central computer of the bank. Clients can enjoy various banking services such as transaction summary review and online fund transfer.

There are some proprietary networks shared by various financial institutions such as banks, securities firms, and insurance companies, which allow their clients to use more sophisticated, combined services. Such financial networks may further be linked to another online system that connects between credit card issuers and merchants, which is used, for example, by the merchants to make inquiries about maximum lending limits for their clients. This kind of internetworking facilitates credit card operations including testing of creditworthiness and fund transfer transactions that must occur as a consequence of credit sales.

As for the conventional facilities for consumers, many financial institutions issue general-purpose cards to their clients, providing them with a unified means for purchasing products or services, using automatic teller machines and automatic fund transfer machines, as well as for executing other transactions related to credit, debit, coupons, and the like. With a dedicated transaction terminal using a home television set as a display device, home banking users can perform online payment for any charged purchases being billed from credit card offices, telephone companies, and others. To enjoy such online services, clients are required to establish an account of their own for use in fund transfer operations. Clients can request a new account by sending a request message over the network.

As outlined above, a wide variety of financial products and services are available in today's online market, and their online catalog data is potentially open to all interested consumers. However, the volume and the variety of such online data are too enormous for them to screen out unnecessary information and reach the desired products or services. In fact, consumers only make access to a limited range of product and service information provided by a few financial institutions with which they have some established connections.

In many conventional systems, the business relationships between consumers and financial institutions are established on an individual basis. This situation makes it inconvenient for individual consumers to manage their personal finance, because they are unable to summarize all distributed accounts and assets in a timely manner.

SUMMARY OF THE INVENTION

Taking the above into consideration, an object of the present invention is to provide a financial information intermediary system which extracts the most suitable product information from a wide variety of financial product data supplied by many financial institutions in the market, so that consumers (or clients) can easily find the desired financial products.

To accomplish the above object, according to the present invention, there is provided a financial information intermediary system for supplying a client with desired on-line information on financial products provided by a plurality of financial institutions.

This system comprises: financial information processing means for collecting and managing financial product information supplied by the plurality of financial institutions; financial product information storage means for storing the financial product information collected by the financial information processing means on an individual basis; client information processing means for registering and managing client preference information obtained from the client; client information storage means for storing the client preference information; and request processing means for retrieving, out of the financial product information storage means, a collection of the financial product information that suits a preference of the client that is described in the client preference information stored in the client information storage means, and sending the collection of the financial product information to a terminal of the client.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3 is a diagram showing an example of a client preference data file;

FIG. 5 is a diagram showing a typical screen shot that appears when a fund allocation service is designated;

FIG. 6 is a diagram showing a typical screen shot displaying a product list;

FIG. 7 is a diagram showing a typical screen shot that indicates a result status of a fund allocation service;

FIG. 9 is a diagram showing a typical screen shot that appears when a process for moving an automatic bill payment account is initiated;

FIG. 10 is a diagram showing a typical screen shot that indicates a result status of the movement of an automatic bill payment account;

FIG. 12 is a diagram showing a typical screen shot that appears on a personal computer screen when an online competition is initiated; and FIG. 13 is a diagram showing a typical screen shot displaying an online competition menu.

DESCRIPTION OF THE PREFERRED EMBODIMENT

Figure 1:
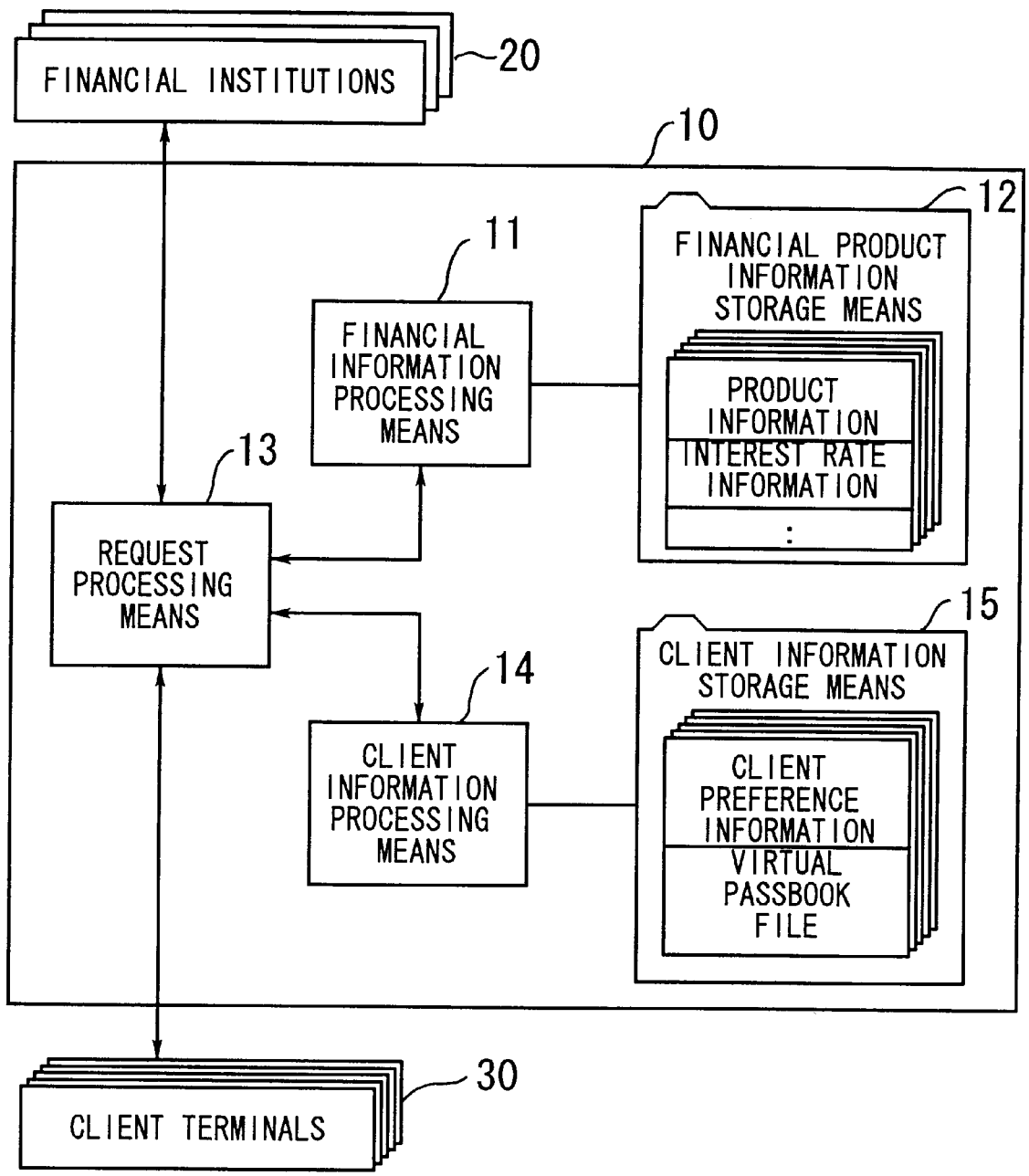
FIG. 1 is a diagram explaining the concept of a financial information intermediary system according to the present invention.

An embodiment of the present invention will be described below with reference to the accompanying drawings. Referring first to FIG. 1, the present invention will be outlined.

FIG. 1 depicts the concept of a financial information intermediary system 10 according to the present invention. This financial information intermediary system 10 is disposed between a plurality of financial institutions 20 and a plurality of client terminals 30. Leased line services are used to connect between the financial information intermediary system 10 and financial institutions 20, while public telecommunications services are used to connect between the financial information intermediary system 10 and client terminals 30.

The financial information intermediary system 10 comprises: financial information processing means 11 for collecting and managing financial product information supplied by the plurality of financial institutions 20; financial product information storage means 12 for storing the financial product information collected by the financial information processing means 11 on an individual basis; client information processing means 14 for registering and managing client preference information obtained from the clients; client information storage means 15 for storing the client preference information; and request processing means 13 for retrieving, out of the financial product information storage means 12, a collection of the financial product information that suits a preference of the requesting client that is described in the client preference information stored in the client information storage means 15, and sending the collection of the financial product information to the client terminal 30 of the requesting client.

More specifically, the financial product information storage means 12 stores information about, for example, what financial products and what interest rates each financial institution offers. Such information is referred here to as the "financial product information." The client information storage means 15, on the other hand, keeps information about each client's preference concerning which financial institutions and what products he/she desires. This information is called the "client preference information."

When a client is enrolled in the present system, the client information processing means 14 obtains preference information of his/her own and stores it into the client information storage means 15. Assume here that one of the client terminals 30 has issued a request for information on some class of financial products. Upon reception of the request from the client, the request processing means 13 asks the client information processing means 14 to retrieve the relevant client preference information from the client information storage means 15. Based on the client preference information retrieved, the request processing means 13 then requests the financial information processing means 11 to search the financial product information storage means 12 for information on appropriate financial products provided by appropriate financial institutions which suit the client's preference.

Such suitable product information, however, may not always be ready in the financial product information storage means 12, or even if it exists there, it may not necessarily be the up-to-date information. In that case, the financial information processing means 11 sends a request for product information to the financial institutions 20 via the request processing means 13. Upon receipt of the latest information, the financial information processing means 11 resumes the retrieval of the financial product information. Further, the financial information processing means 11 updates the contents of the financial product information storage means 12 with the information newly received from the financial institutions 20.

In the way described above, the request processing means 13 obtains a collection of financial product information that meets the client's preference, by retrieving out of the industry-wide database of financial product information which encompasses many different financial institutions 20. The collected pieces of financial product information are sent to the requesting client terminal 30 and displayed on its monitor screen in the form of a data listing. The client is now allowed to make a choice from among the listed information items qualified as being relevant to his or her need. When the client has selected one particular financial product out of the listed items and entered the choice to his/her terminal 30, the choice is transmitted to the request processing means 13 in the financial information intermediary system 10. In response to the client's product selection, the request processing means 13 notifies the relevant financial institution(s) 20 of the content of the selection made by the client and coordinates further transactions to be executed between the client and the financial institution(s) 20 being involved.

Besides keeping the client preference information, the client information storage means 15 holds each client's virtual passbook, which summarizes all records concerning the accounts and financial assets that each client owns in a plurality of financial institutions. Upon receipt of an asset-related inquiry from a client, the request processing means 13 requests the client information processing means 14 to retrieve relevant information and forwards it to the requesting client terminal 30, thereby providing the client with the up-to-date summary of his/her financial assets.

The above-described financial information intermediary system 10 is implemented as an independent entity that is physically separated both from the financial institutions 20 and the client terminals 30. As an alternative arrangement, the financial information intermediary system 10 can be realized as an integral part of each client terminal 30.

To present a more specific embodiment of the present invention, the following description will introduce a typical financial information intermediary system via which financial product information is exchanged between a plurality of financial institutions and general consumers.

Figure 2:
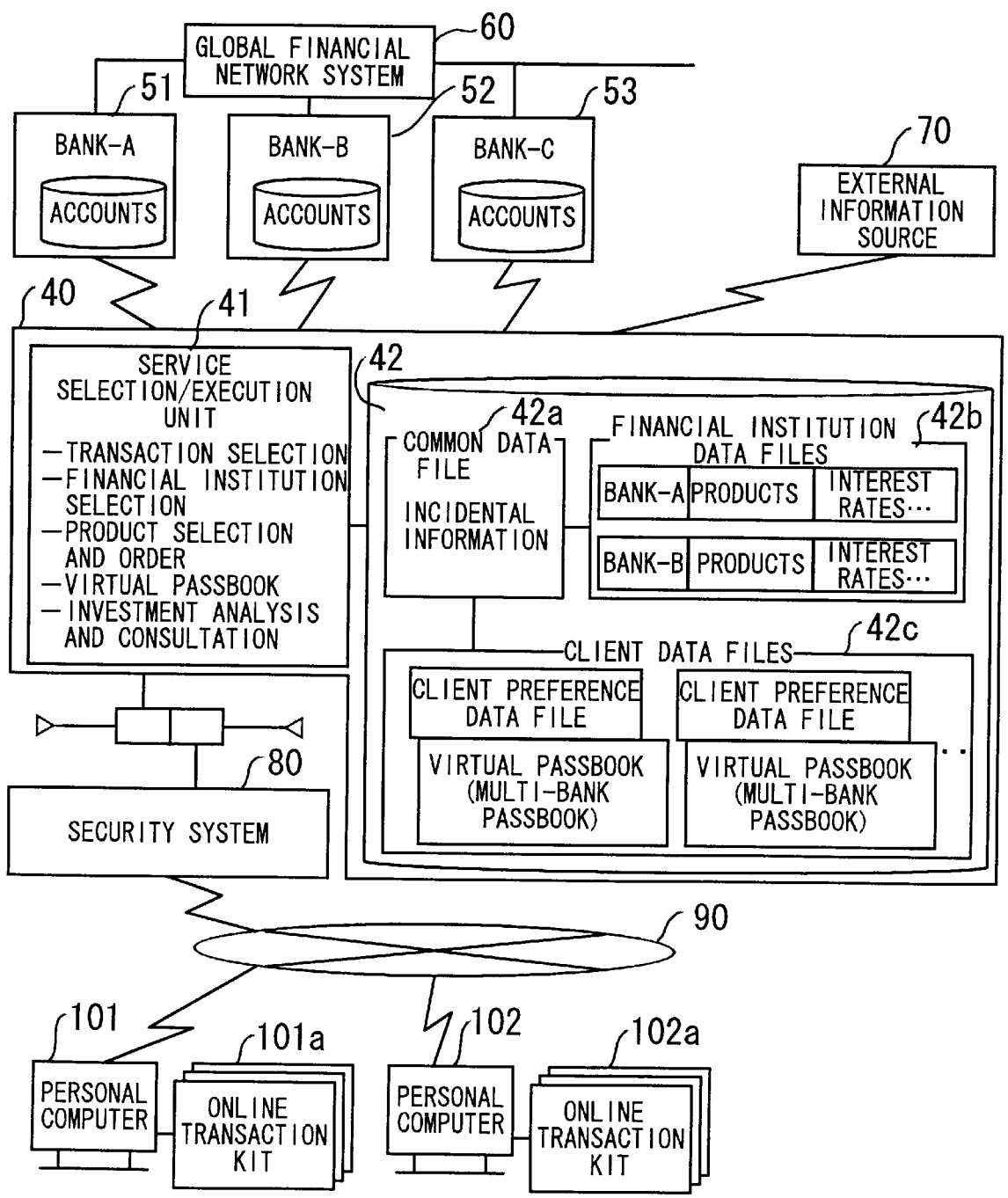
FIG. 2 is a diagram showing an overall networking structure including a financial delivery computer according to the present invention.

FIG. 2 shows an overall networking system structure including a financial delivery computer 40 according to the present invention. This financial delivery computer 40 is linked to a plurality of financial institutions such as bank-A 51, bank-B 52, and bank-C 53 by private (or leased) line services. What is meant by the financial institutions may include any kinds of financial institutions such as commercial banks, savings banks, trust companies, finance companies, life insurers, investment bankers, and securities firms. The banks 51–53 are connected to a global financial network system 60 that provides online intermediary services concerning foreign exchange trade, for example. The financial delivery computer 40 has another link to an external information source 70 to obtain market information such as foreign exchange rates.

The financial delivery computer 40 comprises a service selection/execution unit 41 and a management database 42 in order to respond to any requests from the clients by selecting and executing relevant service applications implemented in the financial delivery computer 40. The service selection/execution unit 41 provides the functions of the financial information processing means 11, request processing means 13, and client information processing means 14 explained in FIG. 1. The management database 42 serves as the financial product information storage means 12 and client information storage means 15. The service selection/execution unit 41 offers the following service functions (a)–(e).

(a) Transaction Selection

This service function includes a variety of transactions and instructions such as:

sign-up for opening a new account;

setup and cancellation of automatic bill payment account;

change in an existing automatic bill payment account (including notification of setup and cancellation to financial institutions involved);

fund transfer and allocation from one financial institution to another;

account movement (including a request for a new account and a request for cancellation of an existing account);

fund reception and remittance; and online competition between financial institutions to allow the clients to choose a financial institution offering the highest interest rates.

(b) Financial Institution Selection

This service allows the clients to select a particular financial institution from among those they have accounts of their own.

(c) Product Selection and Order

This service provides the clients with information on services and products available in each financial institution.

(d) Virtual Passbook (Including Safe Deposit)

This service includes safe deposit management, reporting of a client's account balance, and reporting of a client's asset summary, which are achieved through realtime communication with financial institutions.

(e) Investment Analysis and Consultation

This service includes a support of client's foreign currency deposits, money planning, and investment consultation services. More specifically, the system provides information on the present exchange rates as well as currency market trends and analysis to help clients to put their money on appropriate foreign currency deposits. Money planning and investment consultation services provide total fund management throughout the client's life cycle, including investment analyses to find a well-balanced combination of various types of funds that suit one's investment need and risk level, from low-risk/low-return to high risk/high return instruments.

The management database 42 contains the following three classes of files:

a common data file 42a storing incidental information such as foreign exchange market forecast and risk information, financial institution data files 42b storing data specific to each financial institution, and client data files 42c storing client-specific data.

More specifically, the common data file 42a contains several data items such as foreign exchange rates and their statistics, foreign credit risk ratings and their statistics, credit ratings of individual enterprises and their statistics, and results of their respective trend analyses. The financial institution data files 42b store various data items on an individual institution basis, including the names of financial institutions, product names, product property classes, interest rates per unit payment interval, minimum and maximum deposits, and interest payment units. The client data files 42c fall into the following two kinds of files prepared on an individual client basis: client preference data files and client virtual passbook files (or multi-bank passbook files). Each client preference data file contains preferable product properties (i.e., preferable product types in terms of risk-return tradeoffs), ranking of preferable financial institutions, basic private information describing family structure, annual income, future life plans, and others. The virtual passbook file contains data items such as the names of financial institutions, the number of products, public keys of financial institutions, value or quantity, the latest transaction pointer, and use of safe deposit accounts.

The financial delivery computer 40 is connected to remote personal computers 101 and 102 via a security system 80 and a public telecommunications network 90. Potentially, any analog or digital telephone networks, the Internet, or cable television networks can serve as the public telecommunications network 90.

The personal computers 101 and 102 are each equipped with an IC card slot to mount an IC card. Some dedicated communication terminals with an IC card slot designed for home banking services can be used as alternatives to the personal computer 101 or 102. Every financial institution provides their clients with an online transaction kit to allow the clients to initiate and record transactions. The kit contains, for example, an IC card, an electronic cashing medium, and a personal accounting application for use with personal computers, which provide, in more advanced form, all functions of conventional paper bankbook. FIG. 2 shows that such online transaction kits 101a and 102a are coupled to the personal computers 101 and 102, respectively.

To build the management database 42, the service selection/execution unit 41 as part of the financial delivery computer 40 previously requests the bank-A 51, bank-B 52, and bank-C 53 to provide information on their respective lines of products. The financial product information obtained from the banks 51–53 is stored into the financial institution data files 42b corresponding to them. Each time a new client is enrolled in the system, the service selection/execution unit 41 obtains preference information about which financial institutions the client would like to deal with and what kind of financial products he/she desires, as well as acquiring information on the financial assets owned by the client in his/her accounts. The obtained client preference information and asset information are saved into a relevant client preference data file and client virtual passbook file as part of the client data files 42c. Furthermore, the service selection/execution unit 41 makes access to the external information source 70 to get foreign exchange market forecast, risk-related information, and the like. The obtained data is then stored in the common data file 42a.

Assume here that a client issued a request for a certain class of financial product information by entering commands to his/her personal computer, say 101. Upon receipt of this request, the service selection/execution unit 41 first invokes the aforementioned "product selection and order" service to retrieve the relevant client preference information by making access to the client data file 42c in the management database 42. The service selection/execution unit 41 then makes access to the financial institution data file 42b in the management database 42 to extract appropriate financial product information that meets the client's request and also the preference criteria described in the client preference information. If the financial product information stored in the financial institution data file 42b is outdated, the service selection/execution unit 41 requests the relevant financial institutions to send the latest information on their products. Upon receipt of the latest information, the service selection/execution unit 41 updates the financial institution data file 42b with the received information, and if that information has turned out to be what the client desires, it will be counted among the items to be recommended to the client. In the way described above, a particular class of financial product information that meets the client's need is collected and delivered to the client's personal computer 101.

Upon receipt of the collected financial product information from the service selection/execution unit 41 in the financial delivery computer 40, the personal computer 101 shows it's contents to the client in the form of listing. Referring to that recommended product list, the client determines which product most suits his/her need, and if any favorable one is found in the list, he/she informs the financial delivery computer 40 of the choice he/she made. In response to this, the service selection/execution unit 41 in the financial delivery computer 40 notifies the selected financial institution of the client's decision, thereby mediating the trade between them.

Next, assume that a client is now requesting a specific online banking service such as safe deposit management, account balance status report, or asset summary report. To process the request, the service selection/execution unit 41 disposed in the financial delivery computer 40 invokes the virtual passbook service. The service selection/execution unit 41 makes access to the client data file 42c to retrieve a virtual passbook file relevant to the requesting client and reports the contents back to him/her. Here, if the information in the virtual passbook is outdated, the system inquires the financial institutions about the latest information so that the client will know the up-to-date balance of the financial assets that he/she owns.

The following description will present a more specific configuration of the client preference data files as part of the client data files 42c in the management database 42.

FIG. 3 shows a typical content of the above-described client preference data file. That is, a client preference data file 42ca shown in FIG. 3 contains the following items: (a) risk-return tradeoffs, (b) category of financial institutions, (c) category of investment instruments, (d) product preference, (e) terms of investment, and (f) client's private information.

More specifically, there are several options to specify risk-return tradeoffs including: high-risk/high-return type, low-risk/low-return type, portfolio balance type (allowing risk level designation and commissioned operations), and bidirectional online competition type (i.e., decision is made by bidding). Regarding the category of financial institutions, the clients can broadly specify either banks or securities firms and further classify them under appropriate rankings.

With respect to the category of investment instruments, the clients specify either category of deposit/saving/government bond-related or stock/securities-related. Further, the clients can designate their product preferences by nominating desired types of financial products for each range of the amount. They can also nominate preferable financial products classified by the terms of investment. The clients are requested to provide some private information including family structure, annual income, needs for future life plans, and the like.

Next, the following will present an example transaction processing, where the financial delivery computer 40 transfers funds from the bank-A 51 to the bank-B 52 to seek a higher interest rate.

Figure 4:
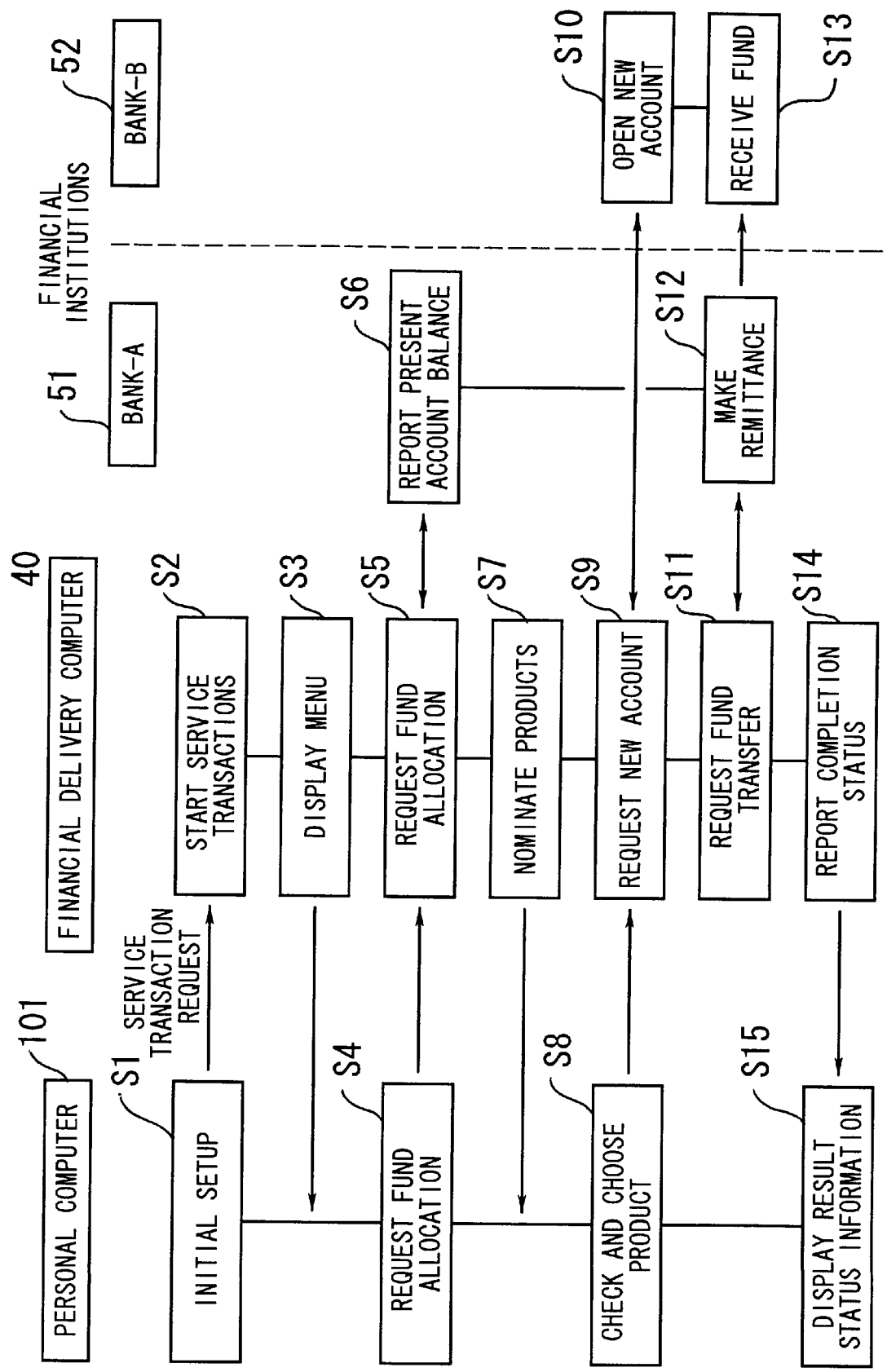
FIG. 4 is a flowchart showing a process of bank-to-bank fund transfer operations.

FIG. 4 is a flowchart showing this bank-to-bank fund transfer process. It is assumed that a client is attempting to move some funds from his/her account in the bank-A 51 to the bank-B 52 where he has no account. This fund transfer transaction is for investment purposes, and thus it is specifically called the "fund allocation" transaction. Assume also that the client is the user of the personal computer 101.

The flowchart depicts a sequence of steps S1 to S15, and the following will describe each of them in that order.

[Step S1] First, the client turns on his/her personal computer 101. The personal computer 101 then displays an initial setup screen, where the user can call up the financial delivery computer 40.

[Step S2] The client enters a command to initiate a service request to the financial delivery computer 40. In response to this, the financial delivery computer 40 executes an initial process including user authentication, and then it starts a session for the requested service transaction.

[Step S3] The financial delivery computer 40 instructs the personal computer 101 to display a menu for selection of services.

[Step S4] Upon receipt of this instruction, the personal computer 101 presents a menu screen to allow the client to choose the desired service out of the menu items. Assume here that the client selects a fund allocation service from among the transaction selection menu.

FIG. 5 is a diagram showing a typical computer screen that appears when a fund allocation service is designated. This screen 111 illustrates a specific fund allocation transaction, where the client intends to allocate a $100,000 fund in his/her deposit account in the bank-A 51 into some appropriate financial instruments for three years. The most bottom line of the screen 111 shows that the client preference data file will be used to determine what product to purchase.

[Step S5] Referring back to FIG. 4, now that a fund allocation service is requested by the client, the request is sent to the financial delivery computer 40. Then the service selection/execution unit 41 in the financial delivery computer 40 will make an inquiry to the designated bank-A 51 about the latest status information on the client's deposit balance, namely, the present available balance. In this case, the service selection/execution unit 41 first checks whether the client's deposit account exists or not in the bank-A 51, referring to the client's virtual passbook file in the management database 42. It then asks the bank-A 51 about the present balance of the client's deposit account so as to confirm that the account holds enough money to allow withdrawal of $100,000 from there.

[Step S6] In response to the inquiry, the bank-A 51 reports the present account balance to the financial delivery computer 40.

[Step S7] Upon confirmation of the client's account balance, the service selection/execution unit 41 retrieves relevant client preference information, which has previously been registered in the client data file 42c. It further searches the financial institution data file 42b for the information on any products meeting the client's preference based on the retrieved piece of the client preference information. The service selection/execution unit 41 then delivers the product information to the personal computer 101.

The financial institution data file 42b, however, may not always be able to present such product information, and it may fail to provide the latest information concerning the products of a particular financial institution specified in the item of "category of financial institutions" as part of the client preference information retrieved. If this is the case, the service selection/execution unit 41 makes an inquiry about the missing product information to the relevant financial institutions before collecting the product information of interest.

[Step S6] Based on the received product information, the personal computer 101 displays a list of recommended products. FIG. 6 illustrates a typical computer screen for this recommended product list. As this screen 112 shows, the recommended product list consists of several data items for each product, such as the name of financial institution, product name, interest rate, interest payment conditions, final yield, and remarks. The client looks through this list and enters his/her choice to the personal computer 101. FIG. 6 shows that he/she has chosen the product b from the bank-B 52. The client is then prompted to enter his/her electronic signature and public key information for client authentication and security purposes.

[Step S9] The financial delivery computer 40 receives the client's choice. Then the service selection/execution unit 41 searches the client's virtual passbook in the management database 42 to test whether or not the client owns his/her account in the financial institution providing the selected product, i.e., the bank-B 52 in this case. Assume here that the client has no account in the bank-B 52. The service selection/execution unit 41 accordingly requests the bank-B 52 to newly open an account for the client.

[Step S10] In response to the account request, the bank-B 52 newly opens a bank account with initial balance of $0.

[Step S11] The bank-B 52 informs the financial delivery computer 40 that the requested account is ready. The service selection/execution unit 41 then initiates necessary transactions for processing the requested fund transfer. More specifically, the service selection/execution unit 41 requests the bank-A 51 to make a remittance to the bank-B 52 for payment of $100,000.

[Step S12] Upon receipt of this request, the bank-A 51 invokes a fund transfer process. That is, the bank-A 51 withdraws a fund of $100,000 from the client's deposit account and transfers it to the bank-B 52 via the global financial network system 60, thereby executing a usual inter-bank settlement service.

[Step S13] At the bank-B 52, the remittance of $100,000 is transferred to the account newly opened for the client, whose balance is registered as a new entry to the client account database of the bank-B 52. Then the bank-A 51 notifies the financial delivery computer 40 of the completion of the requested fund transfer service. In the financial delivery computer 40, the service selection/execution unit 41 updates the client virtual passbook in the management database 42. More specifically, the client's new account in the bank-B 52 is registered to the client virtual passbook and the balance status is updated in both accounts in the bank-A 51 and bank-B 52 to reflect the result of the recent fund transfer from the bank-A 51 to bank-B 52.

[Step S14] The service selection/execution unit 41 finally reports to the personal computer 101 the completion of the whole process of the fund allocation service originally requested by the client.

[Step S15] With this report from the service selection/execution unit 41, the personal computer 101 displays the result status of the transaction as illustrated in FIG. 7.

FIG. 7 is a diagram showing a typical computer-screen that indicates a result status of the fund allocation. This screen 113 shows that the product b was traded at the price of $100,000 and the payment was made through a remittance from the bank-A 51 to the bank-B 52 on May 30, 1997.

As described above, the financial information intermediary system of the present invention displays information on the financial products that suits the client's preference, selectively from among a variety of financial products supplied by many financial institutions. The clients can choose their most preferable products by interacting with the system online. While the above description has illustrated a fund allocation service, the following will present further usage of the financial delivery computer 40 acting as an intermediary between the clients and financial institutions to help them to exchange information.

Figure 8:
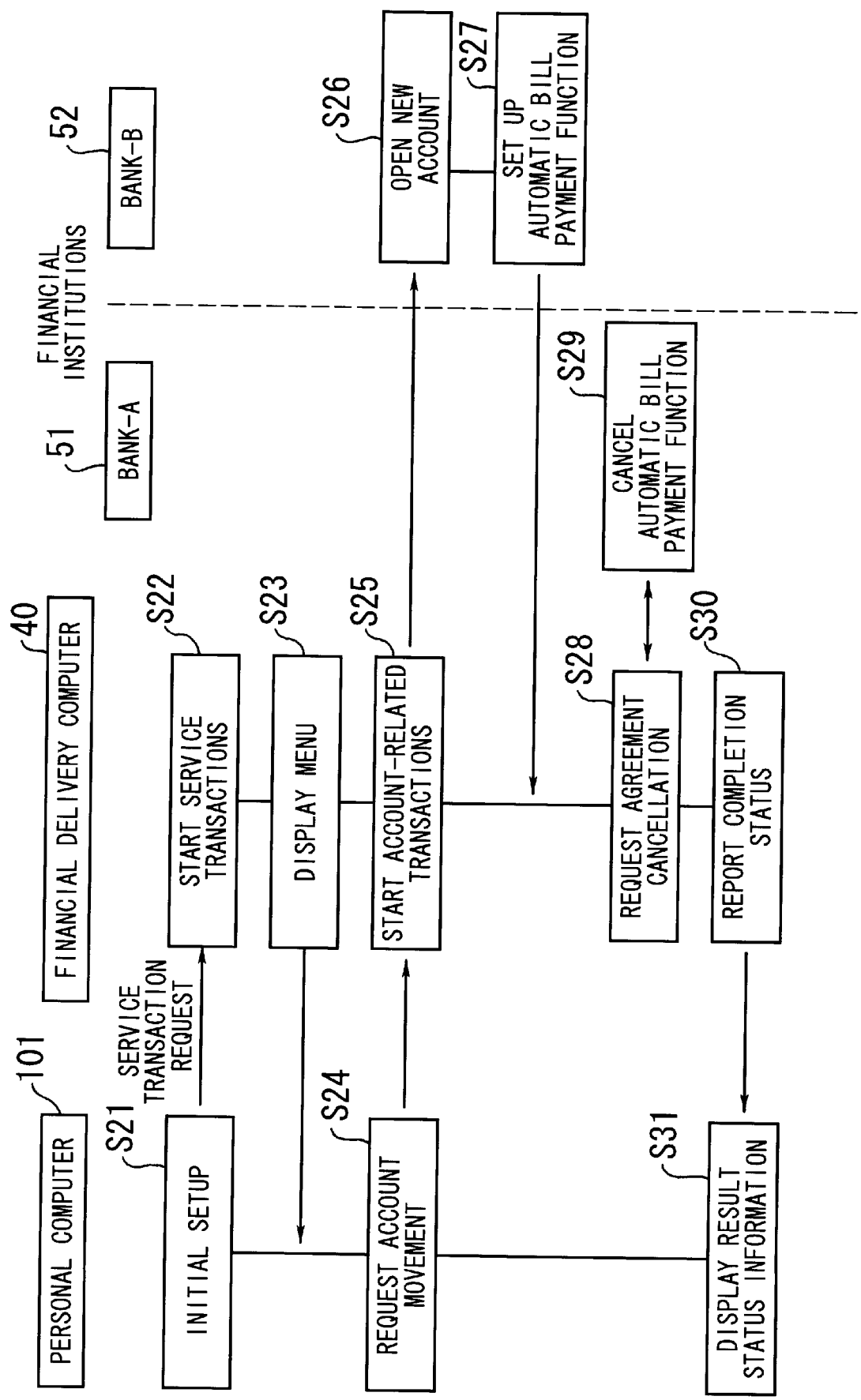
FIG. 8 is a flowchart showing a process for moving an automatic bill payment account.

The following will describe how the system deals with a movement of an existing automatic bill payment account from one bank to another. FIG. 8 is a flowchart showing a process to move an existing automatic bill payment account. Assume that a client is attempting to relocate an existing automatic bill payment account in the bank-A 51 to a new account in the bank-B 52. Here, the client is the user of personal computer 101.

[Step S21] First of all, the client turns on his/her personal computer 101. Then an initial setup screen will appear, where the user can call up the financial delivery computer 40.

[Step S22] The client enters a command to initiate a service request to the financial delivery computer 40. In response to this, the service selection/execution unit 41 of the financial delivery computer 40 executes an initial process including user authentication and then starts a session for the requested service.

[Step S23] The service selection/execution unit 41 of the financial delivery computer 40 directs the personal computer 101 to display a menu to prompt the client to make a selection of services.

[Step S24] Upon receipt of this instruction, the personal computer 101 presents a menu screen to allow the client to choose a menu item. Assume here that the client has selected the desired item "Account movement for automatic bill payment," for example, from among the transaction selection main menu.

FIG. 9 shows a typical computer screen that appears when a process for the account movement transaction is invoked. This computer screen 115 indicates that the client directed a cancellation of his/her automatic bill payment account agreement with the bank-A 51, and in turn he/she directed that the bill payment transactions concerning ;all public utility services be relocated to the bank-B 52.

Referring back to FIG. 8, now that such an account movement service is requested by the client, the request is sent to the financial delivery computer 40.

[Step S25] The service selection/execution unit 41 in the financial delivery computer 40 will start transactions related to the client's account agreements. More specifically, the service selection/execution unit 41 first confirms that the client has an account in the bank-B 52, by consulting the client virtual passbook in the management database 42. It then requests the bank-B 52 to establish an automatic bill payment function for the existing account that is confirmed as being owned by the client. In the present example, however, the client has no account in the bank-B 52. In such a case, the service selection/execution unit 41 will request the bank-B 52 to open an account for bill payment purposes.

[Step S26] In response to the new account request from the financial delivery computer 40, the bank-B 52 newly opens an account for the client.

[Step S27] Subsequently, the bank-B 52 sets up the automatic bill payment function on the account that has just opened. After this setup process is finished, the bank-B 52 notifies the financial delivery computer 40 of the completion, as well as requesting the companies subject to the automatic bill payment function (e.g., a gas company and a waterworks department) to change the destination address of their online billing statements from the bank-A 51 to the bank-B 52.

[Step S28] Upon receipt of this notification, the service selection/execution unit 41 in the financial delivery computer 40 requests the bank-A 51 to cancel the automatic bill payment function with the existing account of the client.

[Step S29] In response to the cancellation request from the financial delivery computer 40, the bank-A 51 updates its local client account database to cancel the automatic bill payment function presently set to the client's account pertaining to all public utility charges addressed to him/her. It then informs the financial delivery computer 40 of the completion of the updates.

[Step S30] The financial delivery computer 40 reports to the personal computer 101 that the whole process of movement of the automatic bill payment account was successfully completed.

[Step S31] With this report from the financial delivery computer 40, the personal computer 101 displays the result status of that finished transaction as illustrated in FIG. 10.

FIG. 10 shows a typical computer screen that indicates the result status of the movement of an automatic bill payment account. This computer screen 116 shows that an online transaction from the bank-A 51 to the bank-B 52 has been conducted so as to move the client's automatic bill payment account for gas and water charges and the new payment account in the bank-B 52 becomes valid on May 30, 1997.

Account relocation is another example of the online transaction supported by the present system. This account relocation transaction is similar to the fund transfer transaction discussed earlier, but it is different in that it always assumes that the client does not have his/her account in the destination and also in that the present account contract is to be canceled. After the account relocation is finished, the financial delivery computer 40 will update, as usual, the client's virtual passbook file as part of the client data file 42c.

Still another application of the present system is an online competition of financial products, which is made possible by the financial delivery computer 40 since it is connected to both clients and financial institutions.

Figure 11:
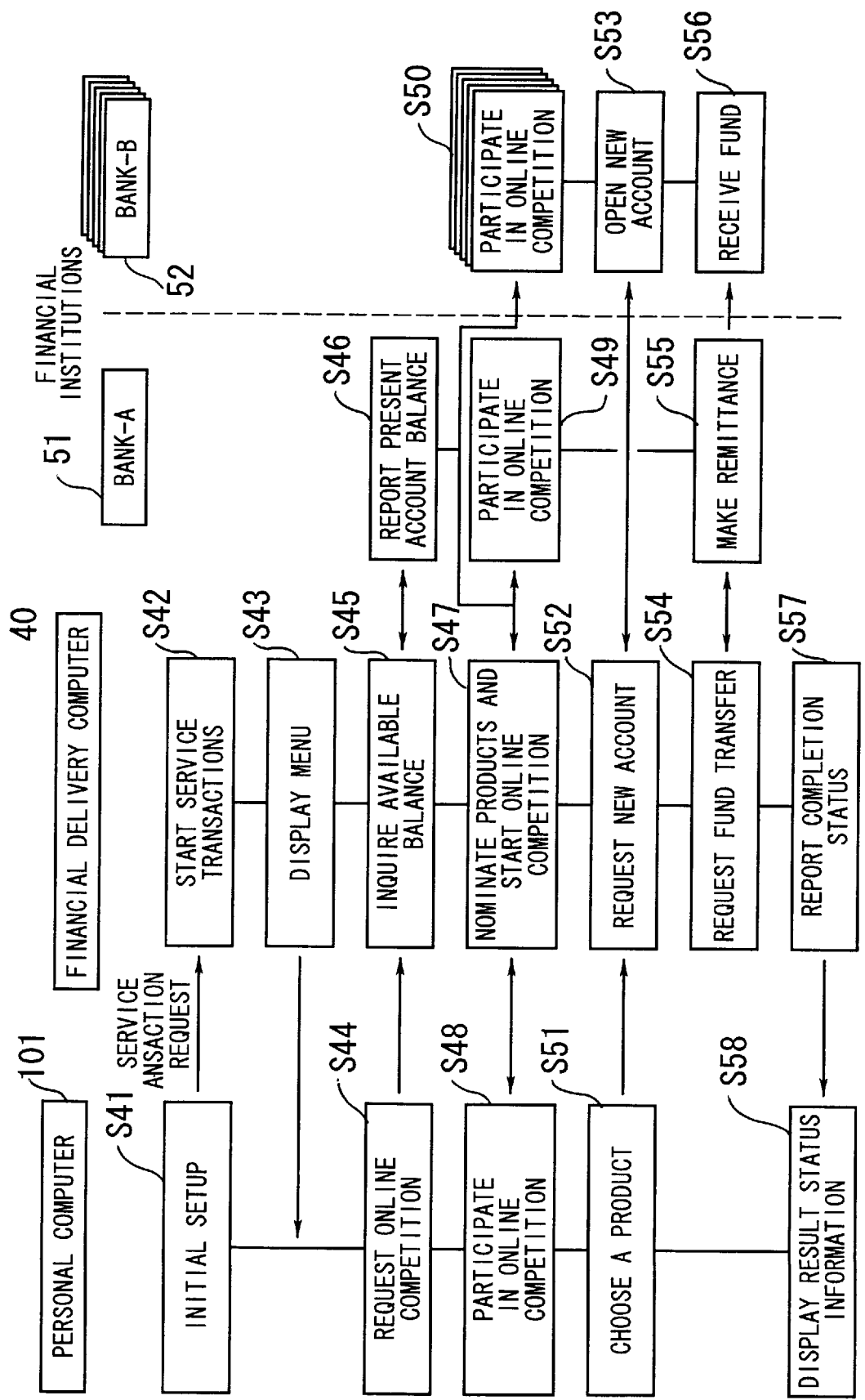
FIG. 11 is a flowchart showing a process of online deposit competition.

FIG. 11 is a flowchart showing a process of deposit competition.

Assume that the user of the personal computer 101 is planning to move his/her money in the bank-A 51 to more profitable places.

[Step S41] First, the client turns on his/her personal computer 101. The personal computer 101 then displays an initial screen where the user can call up the financial delivery computer 40.

[Step S42] The client enters a command to initiate a service request to the service selection/execution unit 41 of the financial delivery computer 40. In response to this, the service selection/execution unit 41 of the financial delivery computer 40 executes an initial setup process including user authentication and then starts a session for the requested service.

[Step S43] The service selection/execution unit 41 instructs the personal computer 101 to display a menu to prompt the client to make a selection of services.

[Step S44] Upon receipt of this instruction, the personal computer 101 displays a menu to allow the client to choose a service item. Assume here that the client selects an online competition service from among the transaction selection menu.

FIG. 12 shows a typical screen that appears on a personal computer's monitor screen when an online competition is initiated.

This screen 121 illustrates a specific competition transaction, where the client intends to allocate a $100,000 fund in his/her deposit account in the bank-A 51 into some other financial instruments for three years. The most bottom line of the screen 121 indicates that the client preference data file will be used to determine what financial product to purchase.

Referring back to FIG. 11, now that the client has chosen the online competition service, that service request is sent to the financial delivery computer 40.

[Step S45] The service selection/execution unit 41 in the financial delivery computer 40 then makes an inquiry to the designated bank-A 51 about the latest status information on the available balance of the client's deposit account. In the present case, the service selection/execution unit 41 first checks whether or not the client's deposit account exists in the bank-A 51 by referring to the client's virtual passbook file in the management database 42. It then requests the bank-A 51 to provide the present available balance of the client's deposit account so as to make sure that the account holds enough money to allow withdrawal of $100,000 for the investment purpose.

[Step S46] In response to that inquiry, the bank-A 51 reports the present account balance to the financial delivery computer 40.

[Step S47] Upon confirmation of the client's available balance, the service selection/execution unit 41 retrieves relevant client preference information, which has previously been registered in the client data file 42c, and it further searches the financial institution data file 42b for the information on any product that meets the client's preference based on the retrieved client preference information. The service selection/execution unit 41 finally delivers the collected product information to the personal computer 101.

[Step S48] The delivery of the product information makes the personal computer 101 ready for the online competition.

[Step S49 and S50] Accordingly, the financial delivery computer 40 initiates the online competition by interconnecting the clients and the financial institutions involved. The financial institution data file 42b, however, may not always have such information concerning the products specified in the item "category of financial institutions" as part of the client preference information, and even if it has some information, it can potentially be outdated. If this is the case, the service selection/execution unit 41 makes an inquiry about the latest product information to the relevant financial institutions before collecting the product information of interest. During the session of the online competition, the personal computer 101 displays a competition menu that is compiled from the product information sent from the financial delivery computer 40.

FIG. 13 shows an example of the competition menu presented to the client. This competition menu screen 122 proposes six financial products that are most likely to suit the client's need, and each product demonstrates its provider's name, product name, interest rate and yield, interest payment conditions, and brief description for its merits. If some financial institutions expressed their non-participation, a message will be displayed on the same screen 122 to inform the client of their withdrawal from the competition. Through this virtual competition via the financial delivery computer 40, the client can choose the desired product.

Referring again to FIG. 11, if the client is interested in a particular product, then he/she begins business discussion with the supplier to further negotiate the interest rate and other conditions.

[Step S51] If the client has successfully closed a deal with the supplier, he/she enters his/her final choice to the personal computer 101 to notify the financial delivery computer 40 of the deal. It is assumed here that he/she has chosen the product b from the bank-B 52.

[Step S52] In response to this notification, the service selection/execution unit 41 in the financial delivery computer 40 searches the client's virtual passbook file in the management database 42 to test whether or not the client has his/her account in the financial institution providing the selected product, i.e., the bank-B 52 in this case. If it is found that the client has no account there, the service selection/execution unit 41 will request the bank-B 52 to newly open an account for the client.

[Step S53] In response to this account request, the bank-B 52 newly opens a bank account with initial balance of $0. The bank-B 52 then sends a message to the financial delivery computer 40 to notify that the requested account is ready.

[Step S54] Upon receipt of this notification message, the service selection/execution unit 41 proceeds to the next transactions of fund transfer. More specifically, the service selection/execution unit 41 requests the bank-A 51 to send a $100,000 remittance to the bank-B 52.

[Step S55] In response to this request, the bank-A 51 invokes a fund transfer process. That is, the bank-A 51 withdraws the fund of $100,000 from the client's deposit account and transfers it to the bank-B 52 via the global financial network system 60, thereby executing a usual inter-bank settlement process. As a result, the client account database of the bank-A 51 is updated so that the client's deposit will be reduced by the $100,000 withdrawal.

[Step S56] At the bank-B 52, the remittance of $100,000 from the bank-A 51 is entered to the account newly opened for the client, and accordingly, the client account database of the bank-B 52 is updated so that the client's account balance will increase by the same amount.

[Step S57] When the above fund transfer is completed, the bank-A 51 informs the financial delivery computer 40 of the completion. Accordingly, the service selection/execution unit 41 updates the client's virtual passbook file in the management database 42. That is, the client's new account in the bank-B 52 is registered to the client's virtual passbook file and the balance status is updated for both accounts in the bank-A 51 and bank-B 52 to reflect the result of the recent fund transfer. The service selection/execution unit 41 finally reports to the personal computer 101 the completion of the whole process of the fund transfer.

[Step S58] With this final report from the service selection/execution unit 41, the personal computer 101 displays the result status of the online competition, which is actually the same as the screen 113 in FIG. 7.

The above-described service selection/execution unit 41 can be enhanced to provide more expanded services. For example, the product selection and transaction processing can be linked to the information imported from the external information source 70 such as interest rate analysis, exchange risk analysis, exchange rates and statistics, foreign credit risk ratings and statistics, credit ratings of each enterprise and statistics, and results of their respective trend analyses. Further, the investment consultation service can be linked to the product selection and transaction processing.

The above discussion will be summarized as follows. According to the present invention, the financial information intermediary system has a database in which consumer's preferences are previously stored, and if a specific request is raised by a client, the system provides a list of recommended financial products that are likely to suit the client's need and preference. To help the consumers to reach the best choice, the system collects industry-wide product information from a plurality of financial institutions and delivers the collected information to the consumers, right online.

That is, the financial information intermediary system filters out unnecessary product information and provides the consumers with only the qualified information that are collected according to their specific preferences. Therefore, the consumers are given a good opportunity to choose the best product from the best financial institution out of a wide range of products available in the market.

Each client of the financial information intermediary system is allowed to have a private virtual passbook which virtually unifies all his/her accounts distributed in a plurality of financial institutions. This multiple bank account management feature permits the clients to control their private financial assets in a unified way.

Network banking businesses are rapidly growing today and it will certainly affect the consumers' behavior in the financial market. Viewing the market from a global standpoint, they will have a wider range of business relationships with many financial institutions. To aid in such increasing business transactions, the system of the present invention provides the consumers with more sophisticated information services including investment consultation based on trend analyses on exchange rates, interest rates, etc.

Furthermore, the system of the present invention is distinctive from conventional online baking services in that it is designed to interconnect between each single consumer and many financial institutions. This feature leads to the development of more complicated transaction services, rather than simple home banking operations. Based on the data supplied from some external information service providers, the system of the present invention will provide advanced product selection and account balance management services linked to estimated exchange and interest rates, as well as supplying risk-free, interest-rate-linked transaction services and safe-keeping assets management service.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A financial information intermediary system for supplying a client with desired on-line information on financial products provided by a plurality of financial institutions, comprising:

financial information processing means for collecting and managing financial product information supplied by the plurality of financial institutions;

financial product information storage means for storing the financial product information collected by said financial information processing means on an individual basis;

client information processing means for registering and managing client preference information obtained from the client;

client information storage means for storing the client preference information;

request processing means for retrieving, out of said financial product information storage means, a collection of qualified financial product information that suits a preference of the client that is described in the client preference information stored in said client information storage means, and sending the collection of the qualified financial product information to a terminal of the client; and online competition means for displaying an online competition menu on a screen of the terminal of the client, which presents the collection of the qualified financial product information and provides the client with an opportunity to negotiate about the financial products being presented, by interconnecting the client and the financial institutions being involved.

2. The financial information intermediary system according to claim 1, wherein said client information storage means has a virtual passbook file that stores information on accounts owned by the client in the plurality of financial institutions, and said client information processing means uses the virtual passbook to make a confirmation of the accounts owned by the client and to execute management of assets owned by the client.

3. The financial information intermediary system according to claim 1, further comprising:

incidental information processing means for obtaining incidental information from an external information source, said incidental information including estimated exchange rate and risk information, and incidental information storage means for storing the incidental information obtained by said incidental information processing means.

4. A method of providing financial information intermediary services that supply a client with information on preferable financial products, which information is provided by a plurality of financial institutions, the method comprising the steps of:

(a) upon receipt of a service request from the client who needs financial product information available from the plurality of financial institutions, retrieving preference information that is previously collected from the client and registered in a preference data file;

(b) determining the financial institutions that suit the preference information retrieved in said step (a);

(c) with reference to qualified financial product information collected in advance from the plurality of financial institutions, obtaining some pieces of the financial product information that suit the preference information; (d) sending the obtained pieces of the qualified financial product information to the client;

(e) receiving from the client a product selection message indicating a financial product selected by the client;

(f) according to the product selection message received from the client, directing the financial institutions involved in a trade of the selected financial product to initiate necessary transactions for the trade and (g) displaying an online competition means on a screen of a terminal of the client, which presents the collection of the qualified financial product information and provides the client with an opportunity to negotiate about the financial products being presented, by interconnecting the client and the financial institutions being involved.

5. The method according to claim 4, wherein said step (c) obtains the financial product information after obtaining a latest version of the financial product information from the determined financial institutions if the financial product information previously collected from the plurality of financial institutions is outdated.

6. A computer-readable medium encoded with a computer program which implements a financial information on-line information on financial products provided by a plurality of financial institutions, the financial information intermediary system comprising:

financial information processing means for collecting and managing qualified financial product information supplied by the plurality of financial institutions;

financial product information storage means for storing the qualified financial product information collected by said financial information processing means on an individual basis;

client information processing means for registering and managing client preference information obtained from the client;

client information storage means for storing the client preference information on an individual client basis;

request processing means, connected to the plurality of financial institutions via a private telecommunications line and connected to a client terminal via a public telecommunications line, for retrieving out of said financial product information storage means a collection of the qualified financial product information that suits a preference of the client that is described in the client preference information stored in said client information storage means, and sending the collection of the qualified financial product information to a terminal of the client, and online competition means for displaying an online competition menu on a screen of the terminal of the client, which presents the collection of the qualified financial product information and provides the client with an opportunity to negotiate about the financial products being presented, by interconnecting the client and the financial institutions being involved.

7. A financial information intermediary system which is linked to a plurality of financial institutions including a first and second financial institutions, comprising:

client information storage means for storing account information descriptive of accounts owned by a client, the accounts including a first account established in the first financial institution; and intermediary processing means, activated by a request from the client for moving transactions related to the first account in the first financial institution to the second financial institution, for transmitting a first request message to the second financial institution for opening a new account and a second request message to the first financial institution for canceling the first account.

8. The financial information intermediary system according to claim 7, further comprising:

updating means for updating the account information stored in said client information storage means, based upon responses to the first and second request messages sent by said intermediary processing means.

9. A financial information intermediary system for supplying a client with desired on-line information, comprising:

a request processing unit retrieving a collection of qualified financial product information based on the preference of the client described in a client preference information, and sending the collection of qualified financial product information to a terminal of the client; and an online competition unit displaying an online competition menu on a screen of the terminal of the client, presenting the collection of qualified financial product information and providing the client with an opportunity to negotiate about the financial products being presented, by interconnecting the client and with financial institutions being involved.

10. A method of providing financial information intermediary services that supply a client with information on preferable financial products, comprising the steps of:

retrieving a collection of qualified financial product information based on the preference of the client described in a client preference information, and sending the collection of qualified financial product information to a terminal of the client; and displaying an online competition menu on a screen of the terminal of the client, presenting the collection of qualified financial product information and providing the client with an opportunity to negotiate about the financial products being presented, by interconnecting the client and with financial institutions being involved.

* * * * *